United States Patent [19]

Smith et al.

[11] 4,226,958
[45] Oct. 7, 1980

[54] PROCESS FOR PREPARING ORGANO-ARSENIC DERIVATIVES OF POLYSTYRENE AND RELATED POLYMERS

[75] Inventors: Curtis P. Smith, Cheshire; George H. Temme, North Haven, both of Conn.

[73] Assignee: The Upjohn Company, Kalamazoo, Mich.

[21] Appl. No.: 69,764

[22] Filed: Aug. 27, 1979

[51] Int. Cl.$^2$ .................. C08F 8/22; C08F 8/24; C08F 8/42
[52] U.S. Cl. .................. 525/356; 525/357; 525/358; 525/359; 525/360; 525/364; 525/388
[58] Field of Search .............. 525/360, 359, 364, 388, 525/356, 357, 358

[56] References Cited

U.S. PATENT DOCUMENTS

| | | | |
|---|---|---|---|
| 3,711,429 | 1/1973 | Ito et al. | 325/360 |
| 4,098,973 | 7/1978 | Smith | 325/360 |
| 4,137,386 | 1/1979 | Smith | 525/359 |
| 4,143,063 | 3/1979 | Alberino et al. | 525/360 |

*Primary Examiner*—William F. Hamrock
*Attorney, Agent, or Firm*—Denis A. Firth; John Kekich

[57] ABSTRACT

A process is described for the preparation of a polymer having a recurring unit of the formula:

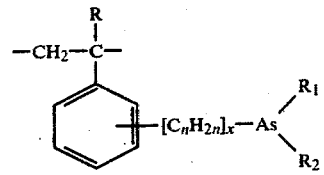

where R is hydrogen or methyl, $C_nH_{2n}$ is lower-alkylene, $R_1$ and $R_2$ are aryl or lower-alkyl, and x is 0 or 1. A polymer having a recurring unit of the formula:

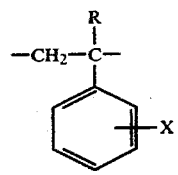

where X is chloro, bromo, iodo, chloroalkyl, bromoalkyl or iodoalkyl, is reacted with the appropriate aryl or alkyl chloride or bromide and arsenic trichloride, arsenic tribromide or arsenic trioxide in the presence of sodium, magnesium, or lithium metal. The resulting polymer is an intermediate in the preparation, by oxidation, of the corresponding As-oxide which polymer is useful as a catalyst for the conversion of isocyanates to the corresponding carbodiimides.

19 Claims, No Drawings

PROCESS FOR PREPARING ORGANO-ARSENIC DERIVATIVES OF POLYSTYRENE AND RELATED POLYMERS

BACKGROUND OF THE INVENTION

1. Field of the Invention

This invention relates to the preparation of modified polystyrene polymers and is more particularly concerned with processes for the preparation of organo-arsenic derivatives of polystyrene and related compounds.

2. Description of the Prior Art

Organo-arsenic derivatives of polystyrene and related compounds have recently been shown to be highly active as catalysts for the conversion of organic isocyanates to the corresponding carbodiimides; U.S. Pat. Nos. 4,098,973 and 4,143,063. The preparative procedures for these polymeric catalysts hitherto described have involved reacting the appropriate polystyrene having a bromo or chloromethyl substituent in at least some of the aromatic nuclei in the polymer chain, with the appropriate dihydrocarbylarsine halide in the presence of metallic lithium. The resulting polymer, having dihydrocarbylarseno substituents in at least some of the aromatic nuclei in the chain, is then oxidized, using hydrogen peroxide or like oxidizing agents, to the corresponding As-oxides which are the polymeric catalysts described in the above cited patents.

The above process has the disadvantage that the dihydrocarbylarsine halides employed as reactants are extremely costly to prepare and this is reflected in the cost of the final polymeric catalysts themselves.

However, in view of the very valuable advantages possessed by the above polymeric catalysts in the preparation of carbodiimides and particularly in the preparation of carbodiimide-containing diisocyanates as set forth in U.S. Pat. No. 4,143,063, supra, it was highly desirable to devise more economical methods for the preparation of these polymeric catalysts. We have now found that these catalysts can be prepared readily by a novel process which involves the use of the relatively inexpensive arsenic trihalides or arsenic trioxide in place of the highly expensive dihydrocarbylarsine halides.

SUMMARY OF THE INVENTION

This invention comprises a process for the preparation of a polymer having in its molecule at least one unit having the formula:

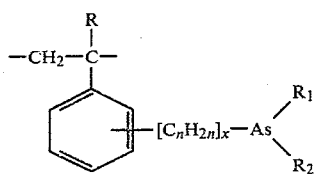 (I)

wherein R is selected from the group consisting of hydrogen and methyl, $C_nH_{2n}$ represents lower-alkylene, $R_1$ and $R_2$ are independently selected from the group consisting of aryl and lower-alkyl and x is 0 or 1, and the remainder of the recurring units in said polymer have the formula:

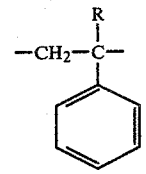 (II)

wherein R is as above defined;

which process comprises reacting a mixture of:

(a) the corresponding polymer having in its molecule at least one unit represented by the formula:

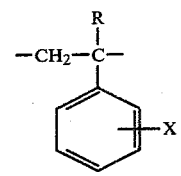 (III)

wherein R has the meaning above defined and X is selected from the group consisting of chlorine, bromine, iodine, lower-chloroalkyl, lower-bromoalkyl and lower-iodoalkyl, the remainder of the recurring units in said polymer having the formula (II) above;

(b) at least one molar proportion, per unit of formula (III) in said polymer, of an arsenic compound selected from the class consisting of arsenic trichloride, arsenic tribromide, and arsenic trioxide; and (c) at least 3 molar proportions, per unit of formula (III) in said starting polymer, of a hydrocarbyl halide selected from the group consisting of aryl chlorides, aryl bromides, aryl iodides, lower-alkyl chlorides, lower-alkyl bromides, lower-alkyl iodides and mixture of said halides;

in the presence of:

(d) a member selected from the class consisting of sodium, lithium, and magnesium.

In a particular embodiment of the process of the invention in with lithium is employed as component (d) the lithium is employed in the form of alkyllithium or aryllithium and component (c) is accordingly not present in the reaction mixture.

The process of the invention also comprises the additional step of oxidizing the polymer obtained in the above process to the corresponding As-oxide.

The term "lower-alkylene" means alkylene having from 1 to 6 carbon atoms, inclusive, such as methylene, ethylene, propylene, butylene, pentylene and hexylene including isomeric forms thereof. The term "aryl" means the radical obtained by removing one hydrogen atom from a nuclear carbon of an aromatic hydrocarbon containing from 6 to 12 carbon atoms, inclusive, and is inclusive of phenyl, tolyl, xylyl, p-butylphenyl, diphenylyl, naphthyl and the like. The term "lower-alkyl" means alkyl from 1 to 6 carbon atoms, inclusive, such as methyl, ethyl, propyl, butyl, pentyl, hexyl and isomeric forms thereof. The terms "lower-chloroalkyl", "lower-bromoalkyl", and "lower-iodoalkyl" mean lower-alkyl as above defined containing a chloro, bromo or iodo substituent respectively.

DETAILED DESCRIPTION OF THE INVENTION

The polymer which is used as starting material in the process of the invention is a polystyrene in which at least one of the recurring units has been substituted in the benzene ring by chloro, bromo, iodo, lower-chloroalkyl, lower-bromoalkyl or lower-iodoalkyl, said unit having the formula (III) above. If desired, as few as one, or as many as all, of the recurring units in the starting polymer can contain the substituent shown as X in formula (III) above. The actual number of such units so substituted in any given instance depends merely on the number of arsenic-containing units of formula (I) which it is desired to introduce into the polymer. Thus, the substituent X can be introduced into any required number of the aromatic nuclei of a polystyrene by employing the appropriate proportion of halogenating or haloalkylating reagent in accordance with procedures known in the art for such halogenation or haloalkylation; see Relles et al. J.A.C.S. 96, 6469, 1974.

Any of the commonly available forms of polystyrene can be employed in preparing the polymers having a proportion of recurring units of formula (III). The commonly available polystyrenes include the homopolymer of styrene itself, the copolymer of styrene and a minor amount of divinylbenzene (generally 2 percent by weight, but higher or lower amounts can be employed if desired), and the homopolymers of vinyltoluene, α-methylstyrene and chlorostyrene as well as the copolymers formed from two or more of the aforementioned monomers. For a detailed description of these various forms of polystyrene and methods for their preparation see, for example, Encyclopedia of Polymer Science and Technology, Vol. 13, p. 128 et seq., John Wiley and Sons, New York, 1970.

In carrying out the process of the invention the various reactants can be brought together, in any order, in the presence of an inert organic solvent. By the latter is meant a solvent which does not enter into reaction with any of the reactants nor interfere in any way with the desired course of the reaction. Illustrative of such solvents are polar solvents such as tetrahydrofuran, dioxane, dimethoxyethane, diglyme (diethyleneglycol dimethyl ether), tetramethylene sulfone, as well as hydrocarbons such as cyclohexane, hexane, benzene, toluene, xylene, and the like.

Depending upon the nature of the halo- or haloalkyl-substituted polystyrene employed as starting material and upon the solvents employed, the polystyrene will be present as a solution or in suspension as an insoluble phase in the process of the invention. Thus, where the polystyrene is one which has not been cross-linked by copolymerization with, for example, divinylbenzene, it is soluble in polar solvents and the process of the invention can be carried out with the starting polymer in solution. On the other hand, where the halo- or haloalkyl-substituted polystyrene employed as starting material is not soluble to any substantial degree in polar or other solvents, the substituted polystyrene is generally reacted, in the form of beads, powdered material, or other forms having relatively small particle size, in suspension and with agitation as appropriate.

In an illustrative embodiment of the process of the invention a solution or suspension of the starting halo- or haloalkyl-substituted polystyrene in an inert organic solvent is admixed, with appropriate agitation, with the arsenic trichloride, tribromide or trioxide at ambient temperatures (circa 20°–25° C.) and the metal or metal derivative [component (d)] is added to the resulting mixture, advantageously under an atmosphere of nitrogen. To the mixture so obtained is then added the aryl or alkyl halide (chloride, bromide or iodide). The latter can be added in a single batch or gradually over a period of time. The addition of the aryl or alkyl halide generally initiates an exothermic reaction which can be controlled, if desired, by appropriate cooling of the reaction mixture or by making the addition of alkyl or aryl halide slowly over a period of time as stated above. Generally speaking, the temperature of the reaction mixture can be allowed to rise to the order of about 70° C. to about 100° C. or can be raised to a temperature within this range by external application of heat. If desired, the reaction temperature can be maintained in this range, advantageously with appropriate agitation, until the reaction is adjudged to be complete. Alternatively, the reaction temperature can be allowed to return, or can be caused to return by external cooling, to ambient temperature and maintained thereat until the reaction is adjudged to be complete.

The progress of the reaction can be followed, and the end point determined, by routine analytical procedures. Illustratively, aliquots of the reaction mixture can be withdrawn at appropriate intervals and examined by infrared spectroscopy, nuclear magnetic resonance spectroscopy, high pressure liquid chromatography and the like.

The desired organoarsenic-substituted polymer having the recurring unit (I) is isolated from the reaction product by conventional procedures. Illustratively, in the case where the polymer is insoluble in the organic solvent employed in the reaction, it is merely necessary to separate the polymer from the reaction solution by filtration, centrifugation, decantation and the like and to wash the isolated polymer with appropriate solvents. In the case where the final polymer is present in solution in the reaction mixture, it can be precipitated therefrom by the addition of an aliphatic alcohol such as methanol or like solvents in which the polymer is insoluble. The precipitate is then separated and washed as described above.

The proportion in which the arsenic trichloride, tribromide or trioxide is employed in the process of the invention is advantageously of the order of about 1 mole to about 3 moles, per molar proportion of the unit of formula (III) in the starting polymer. Preferably the arsenic compound is employed in a proportion of about 1 mole to about 1.5 moles, per molar proportion of the unit of formula (III) in the starting polymer.

The aryl or alkyl halide (chloride, bromide or iodide) is advantageously employed in the proportion of about 3 mole to about 9 moles per molar proportion of the unit of formula (III) in the starting polymer and, preferably, is employed in a proportion of about 3 moles to about 4.5 moles per molar proportion of the unit of formula (III).

The metal or metal derivative employed as component (d) is advantageously present in stoichiometric proportion, i.e. in an amount which is at least sufficient to react with all the halogen (chlorine or bromine) present initially in the starting polymer as well as that which is introduced in the aryl or alkyl halide reactant. Preferably the component (d) is employed in excess of the above amount said excess being of the order of about 25 to about 100 percent over the stoichiometric proportion.

Illustrative of the hydrocarbyl halides which can be employed as component (c) in the process of the invention are chlorobenzene, bromobenzene, iodobenzene, p-chlorotoluene, p-bromotoluene, m-xylylbromide, 1-butyl-4-bromobenzene, p-diphenylylchloride, p-diphenylylbromide, 2-chloronaphthalene, 3-bromonaphthalene, methylbromide, ethylchloride, isopropylbromide, butylchloride, butyliodide, isopentylbromide, hexylbromide, hexylchloride, and the like.

In a modification of the process of the invention in the case in which the component (d) is lithium the use of a combination of the hydrocarbyl halide [component (c)] and lithium employed as component (d) can be replaced by the corresponding hydrocarbyllithium, i.e. a lower-alkyllithium or aryllithium. The hydrocarbyllithium can be preformed using any of the procedures known in the art. When the above modification is employed, the hydrocarbyllithium is present in the reaction mixture in amounts corresponding to those set forth above for the use of the hydrocarbylhalide and lithium metal as separate components.

Illustrative of lower-alkyllithiums employed in the above modified process of the invention are methyllithium, ethyllithium, butyllithium, hexyllithium and the like.

Illustrative of aryllithiums employed in the above modified process of the invention are phenyllithium, p-tolyllithium, m-xylyllithium, p-diphenylyllithium and the like.

The polymers produced in accordance with the process described above can, as explained previously, contain from only about 1 to substantially all of the recurring units in the form shown in formula (I) depending on the proportion of halo- or haloalkyl-substitution in the starting polymer. The polymers obtained as described above can then be converted, by oxidation, using the procedures described in the aforesaid U.S. Pat. No. 4,098,973, to the corresponding As-oxide containing polymers in which the arsenic-containing moieties have the formula:

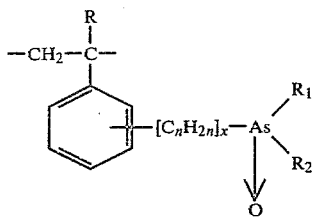

wherein R, $R_1$, $R_2$, $C_nH_{2n}$ and x have the meaning hereinbefore defined. The As-oxide polymers are highly active catalysts for the conversion of organic isocyanates partially or wholly to the corresponding carbodiimides as disclosed in the U.S. patents cited supra.

As will be apparent from the Examples set forth below, the polymers produced in accordance with the process of the invention may contain halo or haloalkyl substituents in minor amounts in the phenyl nuclei thereof, said substituents having been present in the starting polystyrenes. The presence of these substituents does not detract in any way from the valuable utility of the final As-oxide polymers as carbodiimide forming catalysts.

The following preparation and examples describe the manner and process of making and using the invention and set forth the best mode contemplated by the inventors of carrying out the invention but are not to be construed as limiting.

PREPARATION 1

The polystyrene employed in this preparation was 2% divinylbenzene cross-linked polystyrene in the form of beads (200-400 mesh; Eastman Kodak) which were washed successively with mixtures of methylene chloride and methanol in the ratios by volume of 9:1, 3:1, 2:3 and 9:1 and finally with methanol before being dried at 80° C. for 4 hours. The polystyrene beads so treated (50 g.) were suspended in 500 ml. of carbon tetrachloride and 2 g. of thallic acetate was added. The glass vessel containing the reaction mixture was enveloped in aluminum foil to exclude light before adding a solution of 15.4 g. (0.096 mole) of bromine in 20 ml. of carbon tetrachloride. The mixture was stirred for 30 minutes at ambient temperature (20° C.) before being heated at reflux for 1 hour. At the end of this period the mixture was cooled to room temperature and filtered. The solid so isolated was washed successively with 200 ml. each of carbon tetrachloride, methanol, and methylene chloride, dried in air and then washed with 200 ml. each of mixtures of methylene chloride and methanol in the following proportions by volume; 1:0; 2:3, 3:1, 9:1 and 1:0. Finally, the solid was washed successively with 200 ml. portions of acetone, acetone/water (2:1) twice, acetone, methanol and methylene chloride. The solid was then dried for 6 hours at 80° C. at 1 mm. of mercury to obtain 53 g. of yellow beads. Elemental analysis showed the presence of 10.0% by weight of bromine corresponding to the presence of bromine in 12 to 13% of the phenyl nuclei in the polystyrene.

EXAMPLE 1

To a suspension of 10.0 g. (0.0125 mole brominated units) of the brominated polystyrene (obtained as described in Preparation 1) in 100 ml. of anhydrous tetrahydrofuran were added 4.53 g. (0.025 mole) of arsenic trichloride and 1.5 g. (0.22 g. atom) of lithium wire which had previously been cut in 1.8 inch lengths under hexane. The mixture was heated under reflux and a total of 4.0 g. (0.0255 mole) of bromobenzene was added in three equal increments at intervals of 1 hour. The refluxing was continued for a total of 4.5 hours before being cooled to room temperature and allowed to stand overnight under an atmosphere of nitrogen. The mixture was then again heated under reflux while a total of 8 g. (0.051 mole) of bromobenzene was added in six equal increments at intervals of 1 hour. The refluxing was continued for a total of eight hours before being cooled to room temperature. The cooled solution was treated with a few drops of methanol to remove excess lithium and then was filtered. The brown solid so isolated was washed with 250 ml. each of methylene chloride and methanol followed by successive portions of mixtures of methylene chloride and methanol in the ratios by volume of 2:3, 3:1, and 9:1 and finally with 200 ml. of methylene chloride followed by two 200 ml. portions of acetone. There was thus obtained a polystyrene characterized by the presence therein of recurring units having the formula:

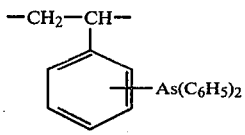

The brown solid so obtained was slurried in 100 ml. acetone and 5.6 g. of 30% by weight hydrogen peroxide was added. After stirring for 4 hours at circa 20° C. the resulting light yellow solid was filtered and washed with 100 ml. of toluene. The solid was slurried in 100 ml. toluene and water was removed by azeotropic distillation. The solid was filtered, washed with 250 ml. each of methylene chloride and methanol followed by successive portions of mixtures of methylene chloride and methanol in the ratios by volume of 2:3, 3:1, 9:1 and finally with 200 ml. methylene chloride. The solid was then dried for 4 hours at 80° C. at a pressure of 1 mm. of mercury. There was thus obtained 10.0 g. of a yellow solid. Elemental analysis showed the presence of 4.52% by weight of arsenic corresponding to approximately 7 percent of the recurring units therein having the formula:

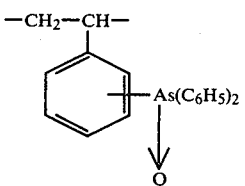

EXAMPLE 2

The brominated polystyrene employed as starting material in the following synthesis was obtained using a repeat of the procedure and materials described in the above Preparation and was found to contain 9.76 percent by weight of bromine corresponding to the presence of bromine in approximately 12 percent of the phenyl nucleii of the starting polystyrene.

To a suspension of 30 g. (36.67 milliequivalents of bromine) of brominated polystyrene in 450 ml. of tetrahydrofuran maintained under an atmosphere of argon there were added 4.2 ml. (50 mmol.) of arsenic trichloride, 24 g. (150 mmol.) of bromobenzene and 3.13 g. (450 mmol.) of lithium metal. An exothermic reaction began and the temperature rose to 65° to 70° C. After the reaction had subsided, the mixture was heated under reflux for 30 minutes and then cooled to room temperature (circa 20° C.) and allowed to remain at this temperature for 16 hours with stirring. At the end of this time the excess lithium was destroyed by the careful addition of 50 ml. of methanol. The solid polymer was isolated by filtration, washed successively with 200 ml. portions of methanol, water, methanol and methylene chloride and then dried at 80° C. overnight. There was thus obtained 31.5 g. of a polymer which was found by elemental analysis to contain 4.57 percent by weight of arsenic indicating that approximately 6 percent of the recurring units in said polymer have the formula:

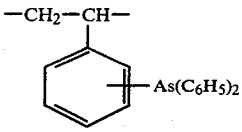

The elemental analysis of the polymer also showed the presence of 2.93 percent by weight of bromine indicating the presence still in the polymer of brominated phenyl nuclei corresponding to the starting material. The balance of the recurring units present in said polymer have the formula:

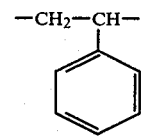

EXAMPLE 3

The brominated polystyrene employed in the experiment described below was that prepared as described at the beginning of Example 2.

To a suspension of 12.5 g. (10.5 milliequivalents of bromine) of brominated polystyrene in 125 ml. of tetrahydrofuran, maintained under an atmosphere of nitrogen, were added 5.63 g. (50.1 mmol.) of chlorobenzene, 1.4 ml. of arsenic trichloride and 3.07 g. (133 mmol.) of sodium metal. The resulting mixture was heated under reflux for 4 hours and then stirred at room temperature (circa 20° C.) for 48 hours. The excess sodium was destroyed by the careful addition of 50 ml. of methanol and the solid polymer was isolated by filtration. The isolated polymer was washed with 100 ml. portions of methanol and water to obtain a polymer characterized by the presence therein of recurring units of the formula:

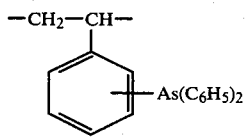

This polymer was then suspended in 100 ml. of acetone and oxidized with 30 percent by weight hydrogen peroxide using the procedure described in Example 1 to obtain 12.57 g. of a polymer in the form of yellow beads. The elemental analysis of the polymer showed the presence therein of 0.44 percent by weight of arsenic indicating that approximately 0.5 percent of recurring units in said polymer have the formula:

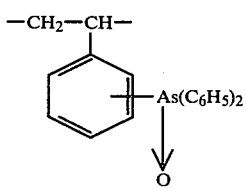

The elemental analysis also showed the presence of 5.59 percent by weight of bromine indicating that approximately 6 percent of the phenyl nuclei in said polymer are substituted by bromine. The balance of the recurring units in said polymer are those having the formula:

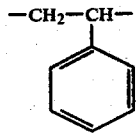

EXAMPLE 4

The brominated polystyrene employed in the experiment described below was that prepared as described at the beginning of Example 2.

To a suspension of 15 g. (8.22 milliequivs. of bromine) of brominated polystyrene in 100 ml. of tetrahydrofuran, maintained under an atmosphere of argon, were added 1.4 ml. (16.6 mmol.) of arsenic trichloride and 5.63 g. (50 mmol.) of chlorobenzene. To this mixture was added 1 g. (144 mmol.) of lithium wire and the resulting mixture was stirred. An exothermic reaction ensued and the solution turned red. The reaction mixture was maintained at reflux for 1 hour and then cooled to room temperature (circa 20° C.) and maintained thereat overnight. The excess lithium was then removed by the careful addition of methanol and the insoluble polymer was isolated by filtration and washed with water to obtain a polymer characterized by the presence therein of recurring units of the formula:

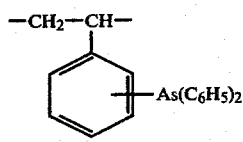

The polymer was then suspended in acetone, without drying, and oxidized using 30 percent hydrogen peroxide in accordance with the procedure described in Example 1 to obtain 15.08 g. of polymer in the form of beads. The elemental analysis of this polymer showed the presence therein of 1.65 percent by weight of arsenic indicating that approximately 2 percent of recurring units in said polymer have the formula:

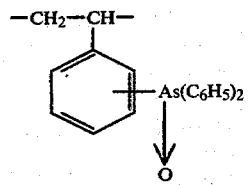

The elemental analysis also showed the presence of 2.16 percent by weight of bromine indicating that approximately 3 percent of the phenyl nuclei in said polymer are substituted by bromine. The balance of the recurring units in said polymer are those having the formula:

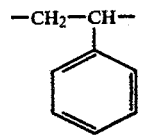

EXAMPLE 5

The brominated polystyrene employed as starting material in the following experiment was prepared in a further run using the procedure and material set forth in the Preparation above and was found to contain 5.54 percent by weight of bromine corresponding to the presence of bromine in approximately 7.5 percent of the phenyl nucleii of the starting polystyrene.

To a suspension of 15 g. (10.4 milliequivs. of bromine) of brominated polystyrene in 125 ml. of tetrahydrofuran, maintained under an atmosphere of argon, was added 1.65 g. (16.7 milliequivs.) of arsenic trioxide and 1 g. (144 mmol.) of lithium. A total of 8 g. (50 mmol.) of bromobenzene was then added to the above mixture with stirring. An exothermic reaction ensued and the mixture turned dark red. The mixture was heated under reflux for 1 hour and then cooled to room temperature (circa 20° C.) and maintained thereat overnight with stirring. The excess lithium was then destroyed by the careful addition of 50 ml. of methanol. The solid polymer was isolated by filtration and washed with water to obtain a polymer characterized by the presence therein of recurring units of the formula:

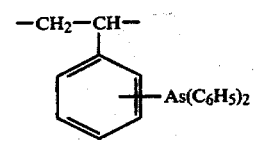

This polymer was suspended in acetone, without drying, and oxidized using 30 percent hydrogen peroxide in accordance with the procedure described in Example 1 to obtain 15 g. of polymer in the form of beads. The elemental analysis of this polymer showed the presence therein of 3.07 percent by weight of arsenic indicating that approximately 3 percent of the recurring units in said polymer have the formula:

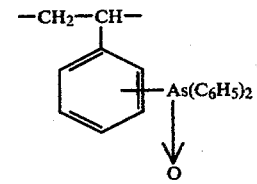

The elemental analysis also showed the presence of 0.45 percent by weight of bromine indicating that approximately 0.6 percent of the phenyl nuclei in said polymer are substituted by bromine. The balance of the recurring units in said polymer are those having the formula:

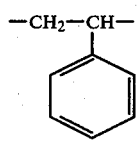

EXAMPLE 6

The brominated polystyrene used as starting material in the following experiment was the same as that employed in Example 5.

To a suspension of 15 g. (10.4 milliequivs. of bromine) of brominated polystyrene in 125 ml. of tetrahydrofuran, maintained under an atmosphere of argon, was added 1.65 g. (16.7 milliequivs.) of arsenic trioxide and 1.3 g. (53.9 mmol.) of magnesium turnings. To this mixture was added with stirring 8 g. (50 mmol.) of bromobenzene and the resulting mixture was heated under reflux for 10 hours. At the end of this time the reaction mixture was poured into 200 ml. of water and the product was filtered. The isolated solid was washed with ammonium chloride solution and with water. There was thus obtained a polymer characterized by the presence therein of recurring units of the formula:

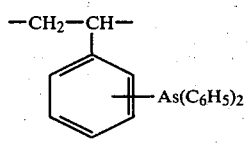

This polymer was suspended in acetone, without drying, and oxidized using 30 percent hydrogen peroxide in accordance with the procedure described in Example 1 to obtain 15 g. of polymer in the form of beads. The elemental analysis of this polymer showed the presence therein of 0.69 percent of arsenic indicating that approximately 0.6 percent of the recurring units in said polymer have the formula:

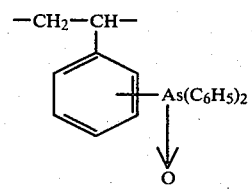

The elemental analysis also showed the presence of 5.94 percent by weight of bromine indicating that approximately 8 percent of phenyl nuclei in said polymer are substituted by bromine. The balance of the recurring units in said polymer are those having the formula:

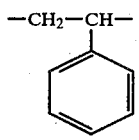

EXAMPLE 7

This Example illustrates a modification of the process of the invention in which a lower-alkyl lithium is employed in place of a combination of metallic lithium and a lower-alkyl halide. The brominated polystyrene used as starting material in the following experiment was prepared in a further run using the procedure and material set forth in the Preparation above and was found to contain 7.6 percent by weight of bromine corresponding to the presence of bromine in approximately 11 percent of the phenyl nuclei of the starting polystyrene.

To a suspension of 11.13 g. (10.8 milliequivalents of bromine) of the brominated polystyrene and 1.4 ml. (16.6 mmol.) of arsenic trichloride in 100 ml. of tetrahydrofuran, maintained under an atmosphere of nitrogen, was added dropwise 32 ml. (49.6 mmol.) of a 1.55 molar solution of butyllithium in tetrahydrofuran. The total time required for the addition was 50 minutes. The temperature rose quickly to 50° C. and remained thereat for most of the addition of the butyllithium. When the addition was complete, the reaction product was cooled to room temperature (circa 20° C.) and was maintained at this temperature overnight with stirring. At the end of this time the excess butyllithium was destroyed by the careful addition of excess methanol (25 ml.). The resulting product was filtered and the insoluble polymer was washed with 50 ml. of methanol. There was thus obtained a polymer characterized by the presence therein of recurring units of the formula:

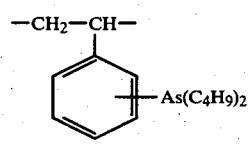

This polymer was suspended in acetone, without drying, and oxidized using 30 percent hydrogen peroxide in accordance with the procedure described in Example 1 to obtain 10.67 g. polymer in the form of beads. The elemental analysis of this polymer showed the presence therein of 1.10 percent by weight of arsenic indicating that approximately 2 percent of recurring units in said polymer have the formula:

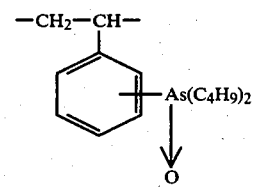

The elemental analysis also showed the presence of 4.25 percent by weight of bromine indicating that approximately 6 percent of the phenyl nuclei in said polymer are substituted by bromine. The balance of the recurring units in said polymer are those having the formula:

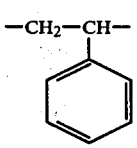

We claim:

1. A process for the preparation of a polymer having in its molecule at least one unit having the formula:

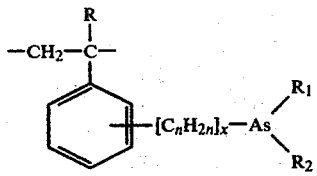 (I)

wherein R is selected from the group consisting of hydrogen and methyl, $C_nH_{2n}$ represents lower-alkylene, $R_1$ and $R_2$ are independently selected from the group consisting of aryl and lower-alkyl and x is 0 or 1, and the remainder of the recurring units in said polymer have the formula:

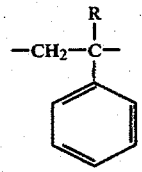 (II)

wherein R is as above defined;
which process comprises reacting a mixture of:
(a) the corresponding polymer having in its molecule at least one unit represented by the formula:

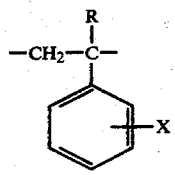 (III)

wherein R has the meaning above defined and X is selected from the group consisting of chlorine, bromine, iodine, lower-chloroalkyl, lower-bromoalkyl and lower-iodoalkyl, the remainder of the recurring units in said polymer having the formula (II) above;
(b) at least one molar proportion, per unit of formula (III) in said starting polymer, of an arsenic compound selected from the group consisting of arsenic trichloride, arsenic tribromide and arsenic trioxide; and
(c) at least 3 molar proportions, per unit of formula (III) in said starting polymer, of a hydrocarbyl halide selected from the group consisting of aryl chlorides, aryl bromides, aryl iodides, lower-alkyl chlorides, lower-alkyl bromides, lower-alkyl iodides and mixtures of said halides;
in the presence of:
(d) an at least stoichiometric proportion, based on the proportion of component (c), of a metal selected from the class consisting of sodium, lithium and magnesium.

2. A process according to claim 1 wherein X in the unit (III) in said starting polymer represents bromine.

3. A process according to claim 1 wherein the hydrocarbyl halide of component (c) is bromobenzene.

4. A process according to claim 1 wherein the component (b) is arsenic trichloride.

5. A process according to claim 1 wherein the component (b) is arsenic trioxide.

6. A process according to claim 1 wherein X in the unit (III) in said starting polymer represents bromine and component (c) is bromobenzene whereby the unit (I) in the resulting polymer has the formula:

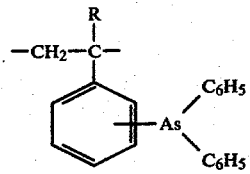

7. A process according to claim 1 wherein the component (d) is lithium.

8. A process for the preparation of a polystyrene in which at least one recurring unit has the formula:

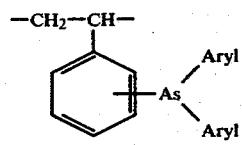

which process comprises reacting a mixture of:
(a) a polystyrene in which at least one benzene nucleus contains a halosubstituent selected from the class consisting of chloro, bromo and iodo;
(b) at least one molar proportion, for each halogenated benzene nucleus in said polystyrene, of an arsenic compound selected from the group consisting of arsenic trichloride, arsenic tribromide and arsenic trioxide; and
(c) at least 3 molar proportions, for each halogenated benzene nucleus in said polystyrene, of an aryl halide selected from the class consisting of aryl chlorides, aryl bromides and aryl iodides;
in the presence of
(d) at least a stoichiometric proportion, based on the proportion of component (c), of a metal selected from the class consisting of sodium, lithium and magnesium.

9. A process according to claim 8 wherein component (c) is bromobenzene whereby the resulting polystyrene contains at least one unit of the formula:

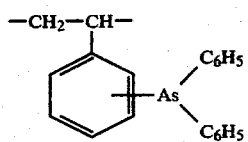

10. A process according to claim 8 wherein the component (b) is arsenic trichloride.

11. A process according to claim 8 wherein the component (b) is arsenic trioxide.

12. A process according to claim 8 wherein the component (d) is lithium.

13. A process for the preparation of a polystyrene in which at least one recurring unit has the formula:

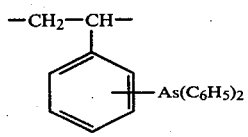

which process comprises reacting, in the presence of an inert organic solvent, a mixture of
- a polystyrene in which at least one benzene nucleus is substituted by bromo;
- at least one mole, per equivalent of bromine in said polystyrene, of arsenic trichloride;
- at least 3 moles, per equivalent of bromine in said polystyrene, of bromobenzene; and
- at least a stoichiometric proportion, based on the proportion of bromobenzene, of metallic lithium.

14. The process of claim 13 in which the inert organic solvent is tetrahydrofuran.

15. A process for the preparation of a polystyrene having in its molecule at least one unit havig the formula:

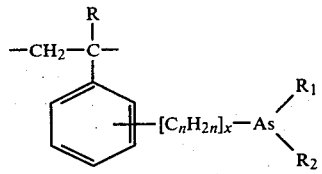 (I)

wherein R is selected from the group consisting of hydrogen and methyl, $C_nH_{2n}$ represents lower-alkylene, $R_1$ and $R_2$ are independently selected from the group consisting of aryl and lower-alkyl and x is 0 or 1, and the remainder of the recurring units in said polymer have the formula:

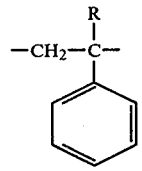 (II)

wherein R is as above defined;
which process comprises reacting a mixture of (a) the corresponding polymer having in its molecule at least one unit represented by the formula:

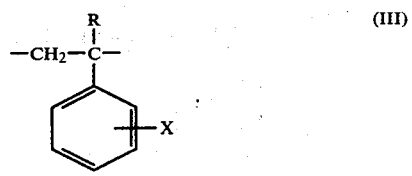 (III)

wherein R has the meaning above defined and X is selected from the group consisting of chlorine, bromine, iodine, lower-chloroalkyl, lower-bromoalkyl and lower-iodoalkyl, the remainder of the recurring units in said polymer having the formula (II) above;

(b) at least one molar proportion, per unit of formula (III) in said starting polymer, of an arsenic compound selected from the group consisting of arsenic trichloride, arsenic tribromide and arsenic trioxide; and (c) at least three molar proportions, per unit of formula (III) in said starting polymer, of a hydrocarbyllithium selected from the class consisting of lower-alkyllithium and aryllithium.

16. The process of claim 15 wherein said hydrocarbyllithium is butyllithium.

17. The process of claim 15 wherein said arsenic compound is arsenic trichloride.

18. The process of claim 15 wherein said reaction is carried out in the presence of an inert organic solvent.

19. A process according to claim 1 which also comprises the step of oxidizing the polymer having the unit of formula (I) whereby there is obtained the corresponding polymer in which each unit of formula (I) has been converted to a unit having the formula:

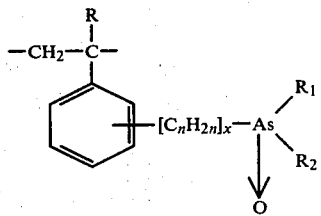

wherein R, $C_nH_{2n}$, x, $R_1$ and $R_2$ have the meanings defined in claim 1.

* * * * *